United States Patent [19]

Weinstein

[11] Patent Number: 5,518,749

[45] Date of Patent: May 21, 1996

[54] HIGH-SPEED EXTRUDATE WEAVING ASSEMBLY AND METHODS

[75] Inventor: James N. Weinstein, Minneapolis, Minn.

[73] Assignee: General Mills, Inc., Minneapolis, Minn.

[21] Appl. No.: 452,783

[22] Filed: May 30, 1995

[51] Int. Cl.[6] ............................. A21C 3/00; A21D 8/00; A23P 1/00

[52] U.S. Cl. .................... 426/500; 264/103; 264/310; 425/319; 425/381; 425/382.3; 426/448; 426/449; 426/516

[58] Field of Search .................................. 426/500, 516, 426/446, 448, 449; 425/381, 382.3, 319, 190; 264/211.11, 310, 103

[56] References Cited

U.S. PATENT DOCUMENTS

| | | | |
|---|---|---|---|
| 2,858,219 | 10/1958 | Benson | 426/516 |
| 3,019,147 | 1/1962 | Nalle, Jr. | 425/382 R |
| 3,054,677 | 9/1962 | Graham, Jr. | 426/448 |
| 3,067,084 | 12/1962 | Nalle, Jr. | 425/464 |
| 4,288,463 | 9/1981 | Groff et al. | 426/500 |
| 5,120,554 | 6/1992 | Farnsworth et al. | 426/516 |
| 5,427,811 | 6/1995 | Fuisz et al. | 426/465 |

*Primary Examiner*—George Yeung
*Attorney, Agent, or Firm*—John A. O'Toole; L. Meroy Lillehaugen

[57] ABSTRACT

An assembly (10) is disclosed including a rotor (38) extending into a rotor bore (24) and into a dough chamber (26) of a die housing (16), with the rotor (38) rotating at relatively high speeds in the order of 4,000 RPM. A bushing (62) is provided in the rotor bore (24) to provide a seal with the rotor (38). The bushing (62) has a small clearance with the rotor (38) sufficient to reduce frictional forces to minimize wear while effectively preventing passage of the extrudable dough under pressure in the order of 2,800 psi (200 kg per square centimeter) through the rotor bore (24) and around the rotor (38). The dough which does pass through the small clearance is allowed to fall away from the rotor (38) outside of the rotor bore (24). In the preferred form, the die housing (16) includes a cooling passage for circulation of cooling fluid to cool the die housing (16) adjacent the rotor bore (24) to prevent the dough passing through the small clearance of the bushing (62) from getting too hot and smoking and/or burning.

20 Claims, 1 Drawing Sheet

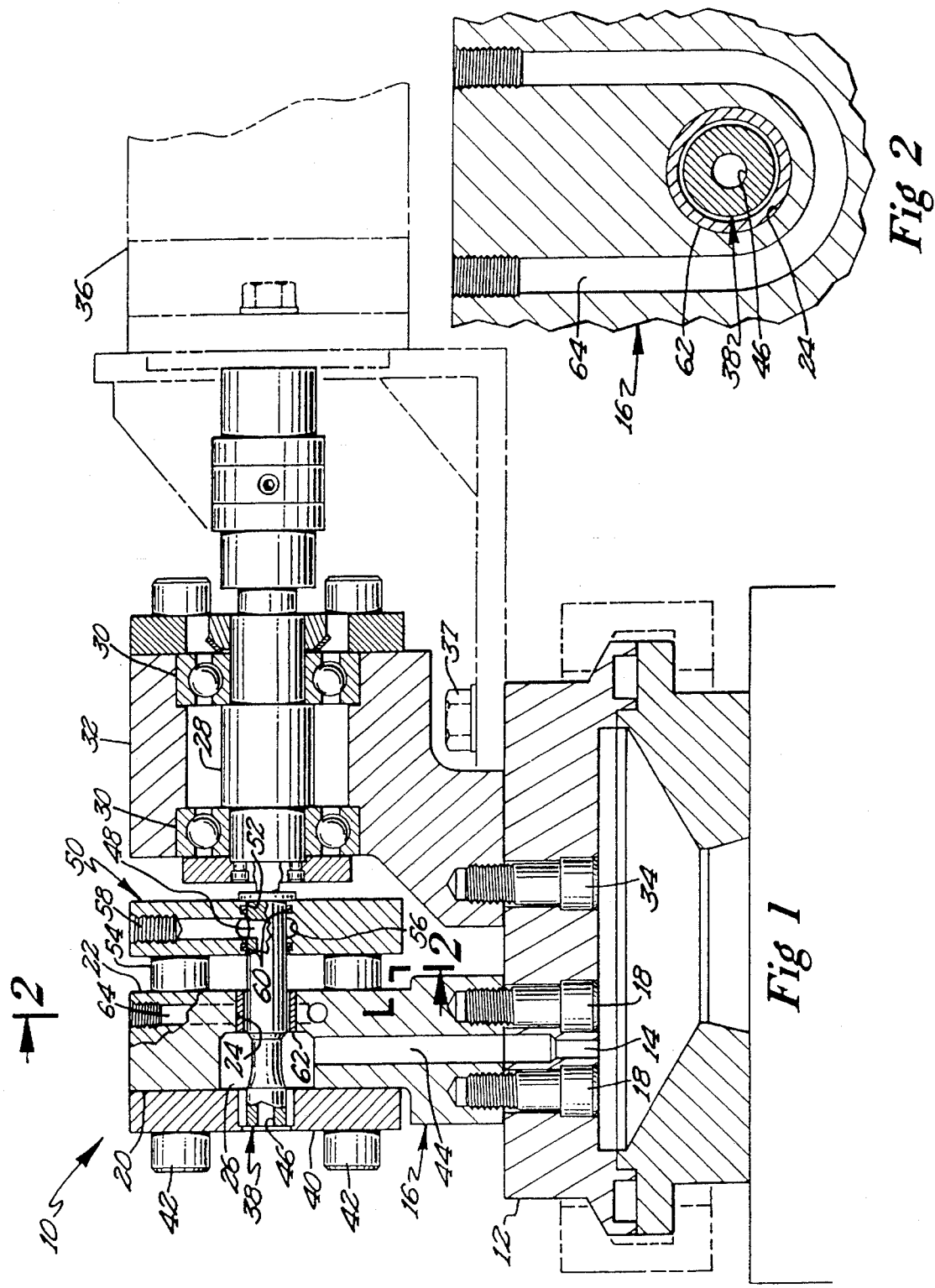

5,518,749

HIGH-SPEED EXTRUDATE WEAVING ASSEMBLY AND METHODS

BACKGROUND

The present invention generally relates to extruding a plastic food product, particularly to weaving food extrudates, and specifically to weaving high-speed food extrudates.

Appearance and texture of cereal pieces in addition to the particular food components utilized comprise important factors in the marketing of ready-to-eat cereal. Woven cereal pieces having a braided appearance and in particular including thin, multiple extrudates (e.g. 4 to 8) twisted to form a braid are believed to have particular market acceptance, and are believed to have a beneficial effect on texture and especially in regard to making high fiber products more palatable and extending cereal life when immersed in milk. Such a braid can be formed by extruding the extrudate using a rotating spindle or rotor. However, problems have been encountered in the food industry in providing a seal with the rotating spindle for preventing the escape of the extrudate from the housing around the rotor. In particular, although the plastics industry utilizes rotary dies, the speed of the extrudate is considerably faster in the food industry than in the plastic industry, with the linear speed of the extrudate in the food industry being as much as 10 times faster than in the plastics industry. The faster the extrudate speed, the faster the rotor must rotate to provide the same criss-cross weave pattern.

Conventional mechanical or elastomeric seals can be designed to withstand high speeds or high pressures but not both at the same time. These seals rely on pressure or force to hold the sealing surfaces together. The higher the pressure across the seal, the more force is needed to hold the sealing surfaces together. The combination of high forces and high-speed rotation creates tremendous amounts of friction which wears the seal out quickly.

Thus, a need exists in the food industry for assembly and methods for weaving high-speed food extrudates. In particular, a need exists for a method and assembly for providing a seal between a shaft or rotor rotating at relatively high speeds and subjected to high extrusion pressures and which is not prone to wear or otherwise fail in normal operation.

SUMMARY

The present invention solves these needs and other problems in the field of food production by providing, in the most preferred form, a small clearance in the bushing providing the seal between the rotating rotor and the rotor bore formed in the housing, with the clearance being sufficient to reduce frictional forces in a manner to minimize wear of the bushing while effectively preventing passage of the extrudable dough under pressure through the rotor bore and around the rotor but allowing dough which does pass through the small clearance to fall away from the rotor outside of the rotor bore.

In a further aspect of the present invention, the dough which does pass through the small clearance is not allowed to get sufficiently hot to smoke and/or burn. In the most preferred aspects of the present invention, the housing is cooled adjacent the rotor bore.

BRIEF DESCRIPTION OF THE DRAWING

FIG. 1 is a sectional view of a rotary die assembly for the production of woven extruded cereal products according to the preferred teachings of the present invention.

FIG. 2 is a sectional view of the rotary die assembly of FIG. 1 according to section line 2—2 of FIG. 1.

Where used in the various figures of the drawing, the same numerals designate the same or similar parts. Furthermore, when the terms "top," "bottom," "first," "second," "upper," "lower," "height," "width," "length," "end," "side" "horizontal" "vertical" and similar terms are used herein, it should be understood that these terms have reference only to the structure shown in the drawing and are utilized only to facilitate describing the preferred embodiment.

DESCRIPTION

A rotary die assembly for the production of woven, extruded cereal products according to the preferred teachings of the present invention is shown in the drawing and generally designated 10. Generally, assembly 10 is mounted to or relative to a means for providing at least one extrudable food product or cooked cereal dough such as a cooker extruder 12. Extruder 12 is seen to have at least one, and more preferably a plurality of, exit ports or orifices 14 each for extruding of cooked cereal or other extrudable food product dough.

While a cooker extruder is the preferred equipment to provide the extrudable food, other conventional equipment and techniques can also be employed. For example, a batch cooker or semi-continuous cooker for cooking the ingredients in bulk can be equipped with a dough forming and conveying extruder element. In other embodiments, e.g. a low moisture fruit paste, a simple screw conveyor can be employed. While in the present description particular reference is made to the provision of complexly patterned farinaceous materials such as R-T-E cereals and snack products, the skilled artisan will appreciate that the apparatus and techniques can be employed with a wide variety of extrudable food products, especially such plastic foods as low moisture fruit products.

Assembly 10 generally includes a die housing 16 mounted to extruder 12 such as by bolts 18. Die housing 16 generally includes a first face 20 and a second face 22 which in the preferred form are generally parallel to and on the opposite sides of port 14. A bore 24 having generally constant circular cross sections extends from face 20 to face 22. A chamber 26 having cross sectional sizes larger than bore 24 extends from face 20 towards but spaced from face 22 and intersects with bore 24 and in the most preferred form is arranged concentrically around bore 24.

Assembly 10 further includes a driven shaft 28 rotatably supported by first and second axially spaced bearings 30 inside a bearing housing 32. Housing 32 is held stationary relative to housing 16 by any suitable means such as by mounting to extruder 12 by bolts 34. Shaft 28 can be rotated by any suitable means such as by hydraulic motor 36 held stationary relative to housings 16 and 32 such as by mounting to extruder 12 by bolts 37. Housing 32 is located axially intermediate housing 16 and motor 36 and is axially spaced from housing 16 in a direction opposite to chamber 26.

Assembly 10 further includes a rotor 38 connected to and extending axially from shaft 28. Rotor 38 is of a diametric size less than bore 24 and extends axially from shaft 28 through bore 24 and chamber 26 past face 20. A die 40 abuts with face 20 and is attached to housing 16 such as by bolts 42. Die 40 includes a suitable opening for receiving a bushing cooperating with rotor 38 to allow food dough to be extruded in elongated extrudates from chamber 26 around rotor 38 and through the bushing, with rotation of rotor 38 causing the extrudate to have a resulting form in the shape of a hollow rope with a mesh surface. In this regard, housing 16 includes an inlet passage 44 extending from chamber 26 to port 14.

In the most preferred form, the extrudate is co-extruded with a filling such as from fruit puree, frosting, another dough, or the like. Specifically, in the most preferred form, rotor 38 includes an axially extending internal bore 46 extending from the free end thereof towards but axially spaced from the end of rotor 38 secured to shaft 28. A radial passage 48 extends from the external surface of rotor 38 and intersects with bore 46. A seal plate 50 includes a bore 52 of a cross-sectional size generally equal to and for rotatably receiving rotor 38. Seal plate 50 is located axially intermediate housings 16 and 32 and is axially spaced from housing 16 in a direction opposite to chamber 26. Seal plate 50 is held stationary relative to housings 16 and 32 by any suitable means such as by stand-offs 54 extending between housing 16 and seal plate 50. Seal plate 50 includes an internal chamber 56 in fluid communication with radial passage 481. An inlet 58 is formed in plate 50 to provide communication of filling to chamber 56 and thus to passage 48 and bore 46. Suitable sealing means such as O-rings 60 can be provided in plate 50 on opposite sides of chamber 56 to prevent leakage of filling through bore 52 around rotor 38.

According to the teachings of the present invention, a unique seal is provided between rotor 38 and housing 16. In particular, a bushing 62 is provided of a size for receipt in bore 24 and having a small clearance with rotor 38 in the diametric range of 0.001–0.003 inches (0.0254–0.0762 mm). It can then be appreciated that the material forming bushing 62 must be selected to have similar co-efficients of thermal expansion as rotor 38 and housing 16 to maintain the desired clearance or must be calibrated and machined in their cold condition to create the desired clearance in their normal operating condition. It can then be appreciated that force is not relied upon for holding the sealing surfaces between bushing 62 and rotor 38 and thus reducing frictional forces dramatically therebetween and resultant seal failure.

It can then be appreciated that extrudate will then leak intermediate rotor 38 and bushing 62, which can cause problems if not handled properly. The first area of concern is to make sure leaked extrudate does not interfere with any of the components of assembly 10 and particularly bearings 30. In this regard, face 22 is axially spaced from and is substantially free of abutment by all remaining components such that an open space is formed allowing leaked extrudate to fall harmlessly away from assembly 10 intermediate face 22 and seal plate 50 in the preferred form or intermediate face 22 and housing 32 if a co-extruded filling is not desired rather than preventing the leaked extrudate from falling away from rotor 38 outside of bore 24.

Another area of concern is to make sure that the leaked extrudate does not have sufficient dwell time to get too hot thus smoking and/or creating a fire danger. In the most preferred form, a U-shaped cooling passage 64 is formed in housing 16 intermediate chamber 26 and face 22. Water can be circulated through passage 64 to maintain the operating temperature of housing 16 around bushing 62 cool and specifically in a range that the leaked extrudate does not get sufficiently hot to smoke or create a fire danger.

It can be appreciated that other manners of preventing the leaked extrudate from smoking and/or burning can be utilized according to the preferred teachings of the present invention instead of or in addition to cooling passage 64. For example, a water spray can be utilized to remove the leaked extrudate as soon as it escapes bushing 62 to minimize dwell time of the leaked extrudate adjacent to any component of assembly 10.

Assembly 10 according to the teachings of the present invention has been found to be practical in overcoming sealing problems in weaving high-speed food extrudate. In particular, rotational speeds of rotor 38 in the order of 4,000 RPM, with linear speed of the extrudate of 500 feet (150 meters) per minute (which was limited by the particular equipment downstream of assembly 10) at an extrusion pressure of 2,800 psi (200 kg per square centimeter) (which was limited by the particular extruder 12 utilized). By way of contrast, the plastics industry utilizes spindles which typically rotate at about 100 to 200 RPM.

It can be appreciated that die 40 can include holes or apertures on the periphery of the openings within which rotors 38 are disposed to extrude stationary (i.e. non-rotating) filaments that form lands or beads that border the woven extrudate or braids formed by the rotation of rotor 38. Likewise, although die 40 in the preferred form shown is stationary, die 40 could also be made to rotate as well according to the teachings of the present invention.

It can also be appreciated that the woven, extruded food extrudates can be face cut at die 40 into cereal pieces, can be cutted and/or crimped into pieces, or can be otherwise processed as desired downstream of die 40.

It can be further appreciated that the particular arrangement of rotor 38 and die 40 can be varied according to the teachings of the present invention, with the particular arrangement shown being for ease of mounting and drive by motor 36. As an example, rotor 38 could be arranged parallel to port 14 if desired.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. Assembly for producing a food product from an extrudable dough comprising, in combination: a housing including a chamber for receipt of the extrudable dough under pressure and a rotor bore intersecting with the chamber; a rotor extending through the rotor bore and into the chamber, with the rotor being rotatable in the rotor bore and the chamber; and first means for effectively preventing passage of the extrudable dough under pressure through the rotor bore and around the rotor comprising a bushing providing a small clearance between the rotor and the rotor bore, said clearance being sufficient to reduce frictional forces due to the relative rotation between the rotor and the rotor bore, with the housing allowing dough passing through the small clearance to fall away from the rotor outside of the rotor bore.

2. The assembly of claim 1 further comprising, in combination: second means for preventing the dough from having sufficient dwell time on the rotor outside of the rotor bore from getting sufficiently hot to smoke and/or burn.

3. The assembly of claim 2 wherein the second means comprises means for cooling the housing adjacent the rotor bore.

4. The assembly of claim 3 wherein the cooling means comprises a cooling passage formed in the housing for passage of a cooling fluid.

5. The assembly of claim 1 wherein the bushing is fixed in the rotor bore.

6. The assembly of claim 1 wherein the small clearance is in the diametric range of 0.001 to 0.003 inches (0.0254 to 0.0762 mm).

7. The assembly of claim 6 wherein the rotor is rotatable in the rotor bore and the chamber at a speed in the order of 4,000 RPM.

8. The assembly of claim 7 wherein the chamber receives extrudable dough under pressure in the order of 2,800 psi (200 kg per square centimeter).

9. The assembly of claim 1 wherein the housing includes a face, with the rotor bore extending between the face and the chamber, with the face being substantially free of abutment by other elements which would prevent the dough passing through the small clearance from falling away from the rotor outside of the rotor bore.

10. The assembly of claim 9 wherein the rotor is rotatable in the rotor bore and the chamber by at least one bearing, with the bearing being axially spaced from the face of the housing in a direction opposite to the chamber.

11. The assembly of claim 1 wherein the housing includes a die head closing the chamber, with the die head including a die opening for receiving the rotor, with the extrudable dough passing from the chamber and being extruded through the die opening around the rotor as the rotor is being rotated.

12. The assembly of claim 11 further comprising, in combination: a filling bore formed in the rotor and extending through the rotor bore and the chamber; and means for communicating a filling into the filling bore during rotation of the rotor.

13. The assembly of claim 12 wherein the communicating means comprises, in combination: a seal plate held in an axially spaced relation to the housing in a direction opposite to the chamber; a filling chamber formed in the seal plate including an inlet for the filling; and a radial passage formed in the rotor extending from the filling bore and in communication with the filling chamber.

14. The assembly of claim 13 wherein the rotor is rotatable in the rotor bore and the chamber by at least one bearing, with the seal plate being axially intermediate the bearing and the housing.

15. The assembly of claim 1 wherein the rotor is rotatable in the rotor bore and the chamber by at least one bearing, with the bearing being axially spaced from the housing in a direction opposite to the chamber.

16. The assembly of claim 1 wherein the rotor is rotated in the rotor bore and the chamber by a hydraulic motor.

17. Method for producing a food product from an extrudable dough comprising the steps of: providing a housing including a chamber for receipt of the extrudable dough and a rotor bore intersecting with the chamber; providing a rotor extending through the rotor bore and into the chamber; providing first means for effectively preventing passage of the extrudable dough under pressure through the rotor bore and around the rotor comprising a bushing providing a small clearance between the rotor and the rotor bore, said clearance being sufficient to reduce frictional forces due to the relative rotation between the rotor and the rotor bore; supplying the extrudable dough under pressure to the chamber; rotating the rotor in the rotor bore and the chamber when the extrudable dough is supplied to the chamber; and allowing dough passing through the small clearance to fall away from the rotor outside of the rotor bore.

18. The method of claim 17 further comprising the step of preventing the dough from having sufficient dwell time on the rotor outside of the rotor bore from getting sufficiently hot to smoke and/or burn.

19. The method of claim 18 wherein the preventing step comprises the step of cooling the housing adjacent the rotor bore.

20. The method of claim 19 wherein the cooling step comprises the step of circulating a cooling fluid through a cooling passage formed in the housing.

* * * * *